June 3, 1941.  F. H. HOPKINS  2,244,334
PRESSURE RESPONSIVE INSTRUMENT
Filed Dec. 13, 1939   3 Sheets-Sheet 1
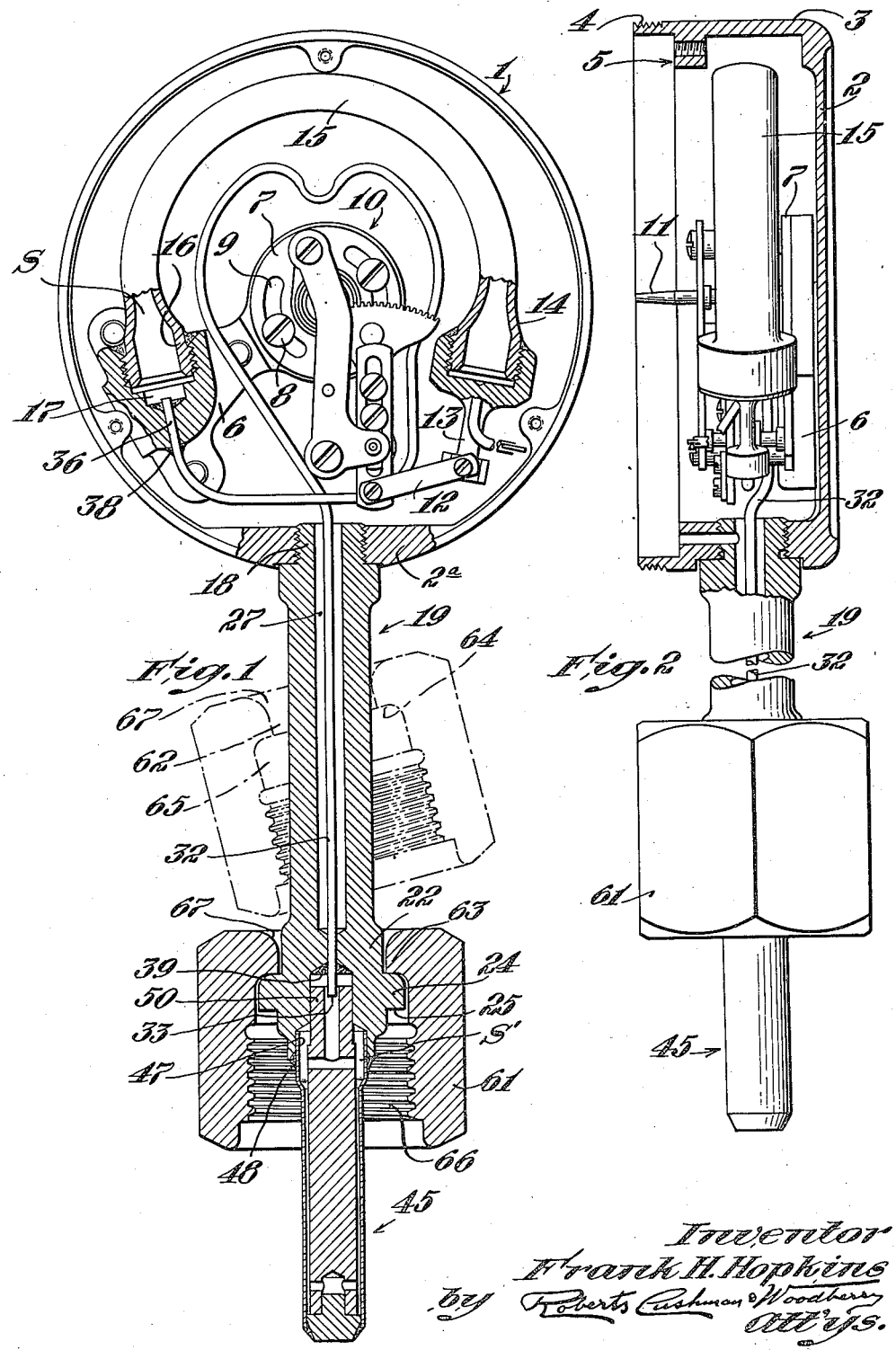
Inventor
Frank H. Hopkins
by Roberts Cushman Woodberry
Attys.

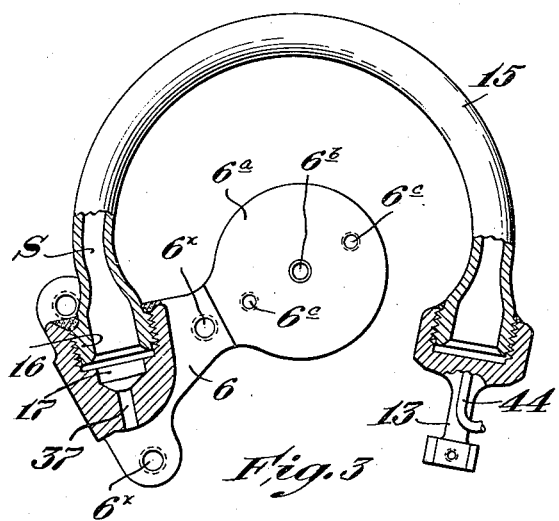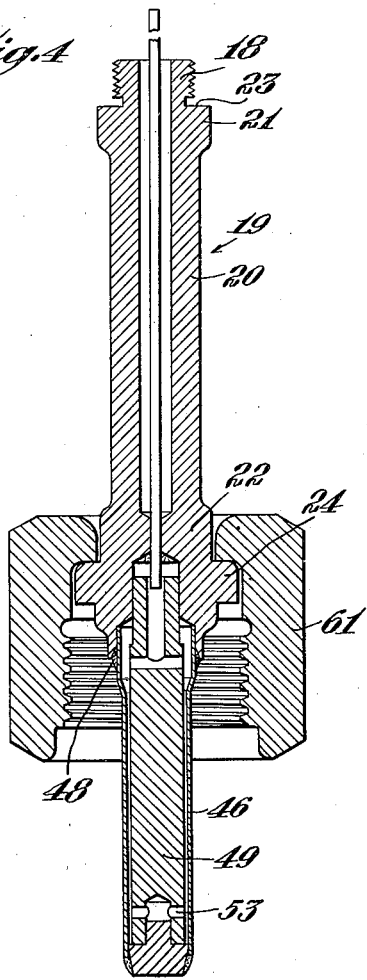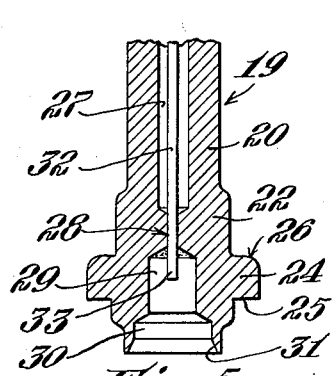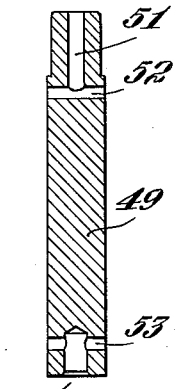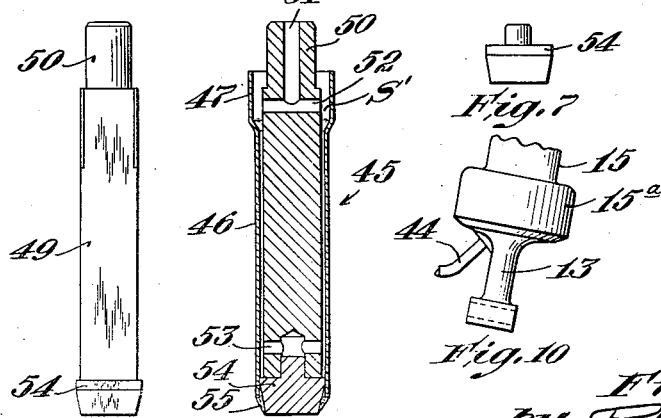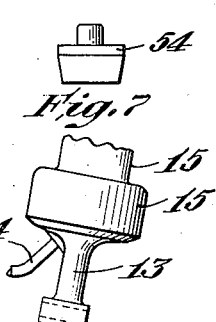

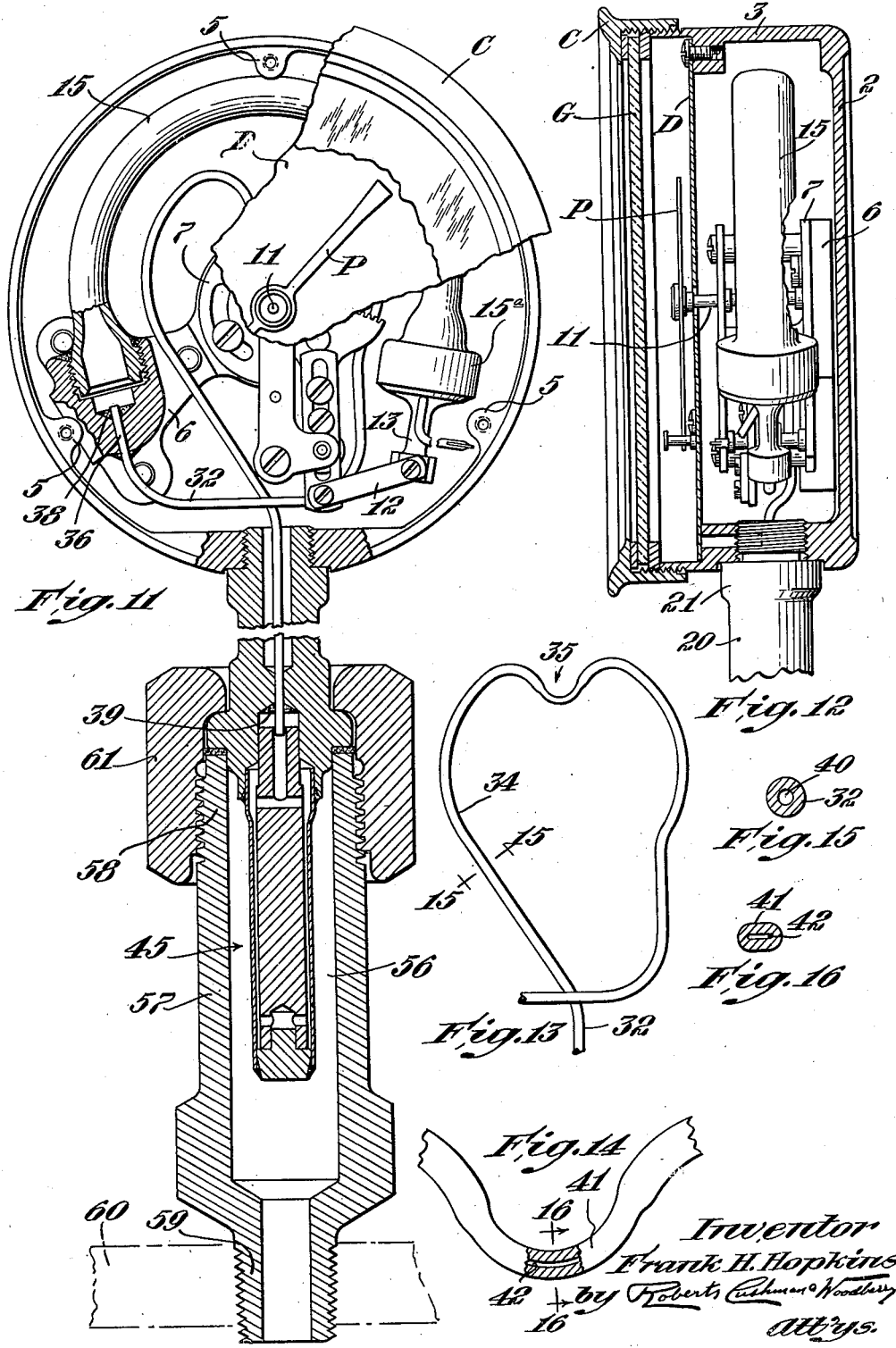

Patented June 3, 1941

2,244,334

UNITED STATES PATENT OFFICE 2,244,334

PRESSURE RESPONSIVE INSTRUMENT

Frank H. Hopkins, Fairfield, Conn., assignor to Manning, Maxwell & Moore, Incorporated, New York, N. Y., a corporation of New Jersey Application December 13, 1939, Serial No. 309,007

11 Claims. (Cl. 73—109)

This invention pertains to instruments, for instance pressure gauges, in which a movable pressure-responsive element, for example a Bourdon tube, is exposed to a variable fluid pressure and changes its position in accordance with such variations in pressure and thereby actuates an indicating needle or pointer, a recording stylus, or the like.

Instruments of this general class are frequently employed in food processing or in the chemical industry, and for such uses are usually provided with guard devices designed to prevent entry of the foodstuff or chemical under treatment into the interior of the gauge, all as more fully described in my copending application for Letters Patent, Serial No. 134,312, filed April 1, 1937. Frequently, as when the instrument is to be used upon the delivery pipe of a reciprocating pump, it is necessary to supply a pulsation dampener operative to prevent fluttering of the index or stylus in response to rapid pressure changes.

While such instruments are a necessary adjunct to the apparatus employed in many such processes as above suggested, the use of such an instrument must not occasion contamination of the substances being treated either by foreign material or, in the case of foodstuffs, by bacterial action. Thus all parts associated with the instrument which come into actual contact with the substance being treated must be non-corrosive and easy to clean, and the entire instrument and its adjuncts must be easily removable from the apparatus to facilitate cleaning. After being so removed from the apparatus, the instrument is subject to handling during cleaning and sometimes to very rough treatment due to carelessness on the part of the user, and for this reason the instrument and its mountings must be strong and rugged and capable of withstanding rough usage without damage to its sensitivity.

The principal object of the present invention is to provide an instrument of the class described (for specific example a pressure gauge) having associated therewith a guard device and, if desired, pulsation dampening means, all so designed and arranged as to be strong, durable, easily mountable upon and removable from the associated apparatus, and whose exterior surfaces are so shaped and designed as to facilitate thorough cleaning and/or sterilization.

A further object of the invention is to provide an instrument comprising the above elements and having the characteristics just referred to and which may be handled as a unit (its parts not normally being separable from each other).

Other and further objects and advantages of the invention will be pointed out in the following more detailed description and by reference to the accompanying drawings, wherein Fig. 1 illustrates an instrument embodying the present invention and comprising in a unitary structure a case which houses gauge parts as well as a pulsation dampener; a rigid tailpiece or stem fixed at one end to the case; a gauge protector fixed to the opposite end of the tailpiece or stem; and a union nut for removably securing the tailpiece to a support—the front cap and dial of the gauge being removed and parts of the gauge mechanism and the stem, protective device and union nut being in vertical section, the nut being shown in its operative position in full lines and in the position for cleaning by broken lines;

Fig. 2 is a side elevation of the device illustrated in Fig. 1, the gauge case being in vertical section in the plane of the axis of the index staff, and the tailpiece or stem being broken away, and the union nut and protective device being in elevation;

Fig. 3 is a front elevation, with certain parts in vertical section, illustrating the bracket which supports the Bourdon tube and the gauge movement, the bracket being removed from the case, and the Bourdon tube being shown as attached to the bracket;

Fig. 4 is a vertical section illustrating the tailpiece or stem with the guard device secured thereto and with the union nut assembled with the tailpiece;

Fig. 5 is a fragmentary vertical section of the lower end of the tailpiece before the assembly of the guard device and union nut therewith;

Fig. 6 is a front elevation of a rigid core member forming part of the guard device;

Fig. 7 is a front elevation of a plug member, constituting a part of the core, shown separate from the body of the core;

Fig. 8 is a longitudinal section of the body portion of the core illustrated in Fig. 6.

Fig. 9 is a vertical section showing the core, the plug, and the pressure flask or outer shell of the guard device assembled;

Fig. 10 is a fragmentary front elevation illustrating a closure cap and movement-actuating bracket secured to the end of the Bourdon tube;

Fig. 11 is a view generally similar to Fig. 1, but showing parts of the instrument cap and dial and with the instrument mounted upon a supporting structure;

Fig. 12 is a fragmentary vertical section of the gauge and a part of the tailpiece or stem;

Fig. 13 is a fragmentary front elevation illustrating the pulsation dampener removed from the gauge case;

Fig. 14 is a fragmentary front elevation, to larger scale, showing the pulsation dampener, with a portion thereof in vertical section;

Fig. 15 is a section, to large scale, on the line 15—15 of Fig. 13; and

Fig. 16 is a section, to large scale, on the line 16—16 of Fig. 14;

Referring to the drawings, the numeral 1 designates the case of a Bourdon tube gauge or equivalent instrument, such case having the rear wall 2 and the cylindrical side wall 3, the latter being screw threaded at its forward edge 4 for the reception of a front closure cap C (Fig. 12). This cap supports the transparent glass panel G which overlies the pointer or index needle P and the dial D, the latter being supported upon lugs 5 projecting inwardly from the wall 3 of the case.

Within the case and secured to the rear wall 2 of the latter is a bracket 6 (Fig. 3) having openings 6ˣ for the reception of studs, screws or rivets by means of which it is attached to the wall of the case, and preferably comprising a more or less circular head portion 6ᵃ disposed coaxially with the case and having a central bearing opening 6ᵇ for the reception of a pivot stud or the like on which is mounted a rotatable plate 7 (Fig. 1). The head 6ᵃ of the bracket is furnished with screw-threaded openings 6ᶜ (Fig. 3) which are designed to receive clamping screws 8 (Fig. 1) which pass through arcuate slots 9 in the plate 7 and by means of which the plate may be secured in position after being rotatably adjusted relatively to the bracket. The plate 7 constitutes the immediate support for the gauge movement 10 (Fig. 1), which may be of conventional type, including the index staff 11 (Fig. 12) upon which the pointer or index needle P is mounted. The bearing opening 6ᵇ in the head 6ᵃ of the bracket is axially aligned with the pivot staff 11 and thus the plate 7 with the gauge movement may be swung about the axis of the pointer for adjusting the parts. Motion is transmitted to the gauge movement by means of a link 12 (Fig. 1) pivotally secured to a bracket 13 forming part of a cap member 15ᵃ (Figs. 10 and 11) constituting a closure for the free end 14 of the Bourdon tube 15. The opposite end 16 of this tube is secured in a socket 17 in the bracket 6.

The wall 3 of the gauge case is preferably thickened at its lower part, as shown at 2ᵃ (Fig. 1), and in this thickened portion is an internally screw-threaded socket designed to receive a screw-threaded nipple portion 18 of a rigid tubular tailpiece or stem 19. This tailpiece or stem is of elongate form, the body portion 20 thereof being substantially cylindrical, and is provided with enlargements 21 and 22 (Fig. 4) adjacent to its opposite ends, respectively, such enlargements or heads being of greater external diameter than the body portion 20. The upper surface 23 of the head or enlargement 21 is designed to seat against a flat surface of the gauge case concentric with the socket which receives the nipple 18, and when the nipple is screwed into the socket, the case and tailpiece become in effect a unitary structure and, if desired, may be permanently united as by welding the upper portion of the head 21 to the case. However, such permanent union is not necessary.

The lower enlargement of head 22 is furnished with a peripheral flange 24 (Fig. 5) of an external diameter substantially greater than that of the head 22 and this flange has a lower radial face 25 (Fig. 5) designed to engage a complemental surface of a supporting structure, hereinafter to be described. The upper surface 26 of this flange is preferably rounded and smoothly convex and the junctions of the body portion 20 with the heads 21 and 22 are also smoothly rounded—the entire tailpiece preferably having a smooth and polished exterior surface.

The tailpiece is tubular, as above described, having the longitudinal passage 27 which is preferably constricted in diameter within the head 22, as indicated at 28, but which then again increases in diameter to form the elongate cylindrical guide recess 29, and this in turn merges with a cylindrical socket 30 of still greater diameter, the lower end of this socket 30 preferably flaring outwardly as indicated at 31.

A pipe 32 of small diameter, for example $\frac{1}{16}$ inch internal bore, has one end 33 disposed within the guide recess 29 and extends up through the passage 27 and into the interior of the case 1. Within the case this pipe is preferably formed to provide a more or less pear-shaped loop 34 (Figs. 1 and 13) whose upper larger lobe embraces the gauge movement. Within this upper lobe is provided a pulsation dampener 35 (Fig. 13). The opposite end 36 of this pipe is secured in a socket or bore 37 (Fig. 3) in the bracket 6, such socket or bore leading into the socket 17 in which the end 16 of the Bourdon tube is fixed. Preferably the pipe 36 is soldered, brazed or welded at 38 (Fig. 11) to the bracket, and near its opposite end 33 is similarly secured at 39 to the tailpiece 19.

The pipe 32 may be a length of ordinary drawn tubing of the usual circular section having therein a passage 40 (Fig. 15) of circular section, but at that portion 35 of the pipe which constitutes the pulsation dampener the pipe is flattened, as indicated at 41 (Fig. 16) so as thereby to constrict the bore and impart to the latter a narrow more or less elliptical or rectangular contour, as shown at 42 (Fig. 16). This flattened portion of the pipe occurs at the bottom of a downwardly directed U-shaped bend in the pipe, such bend being of small radius as compared with the radius of the upper part of the loop 34, and since this flattening occurs within a sharply curved portion of the pipe, the arch effect of such curve adequately resists any tendency of the internal pressure to restore the flattened part of the pipe to a circular cross section. Thus the pulsation dampening effect of the constriction resulting from such flattening is not affected by variations in pressure.

To the lower end of the tailpiece 19 is secured a guard device 45 (Figs. 6 to 9 inclusive). While this guard device may be of any appropriate type, the preferred construction, as illustrated, comprises an outer shell or pressure flask 46, preferably consisting of a length of drawn tubing, for instance stainless steel tubing, or other material which is stiffly resilient and not affected by the pressure fluid to which it may be subjected and which provides a smooth, easily cleanable exterior surface. Preferably this pressure flask or shell 46 is of square transverse section throughout the major portion of its length, but its upper end 47 is of circular transverse section and of a diameter such that it may fit snugly within the socket 30 at the lower end of the tailpiece. After the upper end of the shell has thus been fitted in the socket 30, it is permanently secured in place by welding metal 48 (Fig. 4) or by sweating the parts together, or otherwise so as to form a leakproof union. Within the shell or pressure flask is a rigid core member 49 (Figs. 4 and 6) constituting a strut for supporting the shell or pressure flask against transverse deflection or other stress tending to break or permanently deform it. This core 49 is also preferably of square transverse section throughout the main part of its length, but of smaller dimensions than the shell or pressure flask 46 so that there exists a space S' between the inner surface of the shell and the faces of the core member.

This core member is provided with a stem 50 at its upper end, such stem being of circular transverse section and being designed to fit within the guide recess 29 at the lower part of the tailpiece—the stem having a sliding fit within said guide recess. The stem 50 is provided with an axial passage 51 which communicates with a transverse canal 52 whose opposite ends communicate with the space S'. Preferably another transverse canal 53 extends across the core member near its lower end. A plug 54, secured in any desired manner to the body of the core member, fills the lower end of the shell 46 and constitutes a leakproof closure for the lower part of the space S', this plug or closure 54 being permanently secured to the shell by means of welding metal 55 or equivalent means.

When the parts are assembled (Fig. 1), the lower end 33 of the pipe 32 extends down into the passage 51 in the core 49, thus providing free communication between the space S' in the guard device and the space S within the Bourdon tube. After the parts are thus assembled, these several spaces, including the passage through the pipe 32, are filled with a non-compressible fluid such as glycerin or oil, by means of a filling tube 44 (Fig. 10) which passes through the cap 15a at the tip of the Bourdon tube, the tube 44 being permanently sealed after the spaces have thus been filled with liquid.

The structure comprising the gauge 1, the tailpiece 19, and the guard device 45 is designed to form a unit for mounting upon apparatus containing a pressure fluid. As here illustrated, this apparatus comprises the supporting member 57 (Fig. 11), here shown as a sleeve-like housing having the elongate chamber 56 into which the pressure fluid is admitted and which houses the protective device 45 and guards said device from mechanical injury when the instrument is in use. The upper part of this housing 57 is cylindrical and externally screw threaded, as shown at 58, while its lower end is preferably shaped to form the externally screw-threaded nipple, designed to be screwed into a socket in the wall 60 of a receptacle, vat, or conduit forming a part of the apparatus in which the pressure fluid is contained.

For securing the tailpiece 19 and associated parts to the supporting housing 57, the tailpiece is furnished with a union nut 61 having an axial bore 62 (Fig. 1) in an inwardly directed flange 63, such bore 62 being of a diameter such as loosely to receive the lower head 22 of the tailpiece. The inner or lower surface of the annular flange 63 is preferably concavely curved as shown at 64 and, when the parts are assembled in operative position, engages the curved upper surface 26 of the flange 24 of the tailpiece. The bore 62 is enlarged throughout the greater portion of the thickness of the nut to provide the chamber or socket 65 internally screw-threaded at 66 and designed to receive the screw-threaded part 58 of the housing 57. The upper edge of the part 58 is faced off to provide a radial surface designed directly to engage the radial surface 25 of the flange 24 of the tailpiece or, if preferred, a suitable packing or washer may be interposed between said surfaces. By tightening the union nut 61 upon the threaded part 58, the tailpiece may be very firmly clamped to the upper end of the housing 57, thus constituting a support and guard for the protective device 45 which is now disposed within the chamber 56, and also supporting the gauge 1 which is thus located at a substantial distance above the receptacle 60.

The bore 62 of the union nut preferably flares in diameter toward the upper end of the nut, as shown at 67 (Fig. 1), it being noted that the bore 62 is of substantially larger diameter than the body portion 20 of the tailpiece. The body portion of the tailpiece is of such length that when the union nut is backed off from the threads on the part 58 (as shown in broken lines in Fig. 1) so as to disconnect the instrument from the housing 57, the nut 61 may be disposed wholly above the head 22 of the tailpiece, and then, by reason of the fact that the bore 62 of the nut is substantially greater than the diameter of the body portion of the tailpiece and also by reason of the flaring taper of the upper part of the bore 62, the nut may be swung to a position such for example as indicated in the broken lines in Fig. 1 so that it is out of axial alignment with the tailpiece. Such tipping of the nut may easily be through an angle of 15° or more, and when so tipped, the interior of the nut is exposed, making it very easy to clean the entire inner surface of the nut, including the screw threads.

When the apparatus is removed from the housing 57—the case 1, the tailpiece 19, the protector device 45, and the nut 61 all come away as a unit, and since all of the exposed exterior surfaces are smooth, free from irregularities or abrupt shoulders or projections, and since even the interior surface of the nut may be freely exposed, it is readily possible to clean all of these parts and, if desired, to sterilize them. It may be noted that the pulsation dampener 35 is wholly housed within the gauge casing so that it is protected from mechanical injury and does not occupy any space in addition to that required for the gauge case itself. Furthermore, since the protective device 45 includes the rigid strut or core 49, which cannot move transversely, by reason of the interfitting of the rigid stem 50 and the guide recess 39—the thin and flexible walls of the pressure flask of the guard device are protected from stresses such as might cause permanent deflection or injury. The instrument is thus highly useful for such purposes as those above suggested, in particular where it must be removed at very frequent intervals from the associated apparatus, for instance daily or even oftener, for thorough cleaning of the instrument and its associated parts and of the apparatus with which it is employed.

While the housing 57 is here shown as a part which is removable from the vat or other receptacle with which the device is used, such part 57 being in the nature of an adapter to permit the use of the instrument with any sort of apparatus, it is contemplated that the equivalent of the housing 57 may be a permanent part of the vat or other pressure fluid container, the only requirement being that the part which corresponds to the housing 57 be furnished with a chamber 56 for the reception of the protective device and a screw-threaded part corresponding to the part 58 for engagement with the screw threads of the union nut.

While certain desirable arrangements have herein been described by way of example, it is to be understood that the invention is not necessarily limited thereto but is to be considered as inclusive of all equivalent constructions falling within the terms of the appended claims.

I claim:

1. An instrument of the class described comprising a case housing a Bourdon tube, gauge movement mechanism, an index and a graduated dial, and an elongate, rigid, unitary tubular tailpiece forming a support for the case and having one end fixed to the case, the tailpiece comprising an elongate, smooth, cylindrical body portion and a head of a diameter greater than that of the body portion, the head having a radial flange, and a union nut for securing the tailpiece to a support, said union nut having an axial bore of a diameter such as to accommodate the head portion of the tailpiece but through which the flange cannot pass, the body portion of the tailpiece being of a length such that the nut can be disposed thereon wholly out of engagement with the head, the nut being tiltable out of axial alignment with the body portion when so disposed on the body portion of the tailpiece, thereby to expose the interior of the nut for cleaning.

2. An instrument of the class described comprising a case housing a Bourdon tube, a gauge movement mechanism, an index and a graduated dial, and an elongate rigid, unitary, tubular tailpiece constituting a support for the case and having one end fixed to the case, the tailpiece comprising an elongate smooth cylindrical body portion and a head of a diameter greater than that of the body portion, the head having a radial flange, and a union nut for securing the tailpiece to a support, the union nut having an axial bore of a diameter slightly greater than that of the head of the tailpiece but less than the diameter of said peripheral flange, the body portion being of a length such that the entire nut may be disposed thereon out of contact with the head, the bore of the nut flaring in diameter toward the upper end of the nut whereby, when the nut is disposed on the body portion of the tailpiece, it may be freely tilted out of axial alignment with the tailpiece.

3. An instrument of the class described comprising a case, and a rigid unitary supporting tailpiece therefor, said tailpiece comprising an elongate smooth and cylindrical body portion, the tailpiece having one end thereof secured to the case and having a radial flange adjacent to its other end, a guard device secured to the latter end of the tailpiece, and a union nut engaging said flange of the tailpiece, said union nut being designed to engage a threaded part of apparatus with which the instrument is associated thereby to secure the instrument in operative position, the nut and tailpiece being so constructed and arranged that the nut, when disengaged from the threaded part of the apparatus, may be positioned to expose all of its surfaces for cleansing.

4. Apparatus of the class described wherein a gauge is removably associated with a receptacle for material to be treated, said receptacle having a chamber designed to receive a guard device for the gauge, the chamber being defined by a housing provided with an exteriorly screw-threaded portion, a union nut normally engaging said threaded portion, the gauge having a rigid unitary supporting tailpiece having a head provided with an integral flange engageable by a part of the union nut thereby removably to unite the gauge to the casing, the tailpiece comprising a smooth cylindrical body portion and a head portion of a diameter greater than the body portion, the head portion having a radial flange, the body portion being of such diameter that when the nut is disengaged from the housing and from the flange and head of the tailpiece and disposed upon the body portion of the tailpiece it may be tilted to expose every portion of the nut for cleaning, and a guard device for the gauge permanently secured to the flange end of the tailpiece.

5. Apparatus of the class described wherein a gauge is associated with a receptacle for material to be treated, said receptacle having a chamber designed to receive a guard device for the gauge, the chamber being defined by a casing provided with an exteriorly screw-threaded portion, a union nut normally engaging said threaded portion, the gauge having an elongated, rigid, unitary supporting tailpiece provided with a head having an integral radial flange engageable by a part of the union nut thereby removably to unite the gauge to said casing and a guard device permanently secured to the flanged end of the tailpiece, characterized in that the radial flange on the tailpiece has a smoothly rounded convex upper surface, and the nut has an inwardly directed flange provided with a concavely rounded under surface for cooperation with the rounded surface of the flange of the tailpiece, the inner diameter of the flange of the nut being such that the nut fits loosely about the body of the tailpiece when removed from the flange and head and disposed thereon, thereby to permit the nut to be tilted to facilitate cleaning its interior.

6. An instrument of the class described including a casing and a rigid unitary tubular tailpiece having one end secured to the casing, a bracket fixed to the interior of the casing wall, a Bourdon tube having one end anchored to the bracket, a gauge movement mounted on the bracket, means for transmitting motion of the free end of the tube to the gauge movement, a pipe extending from the lower end of the tailpiece longitudinally through the latter into the case, said pipe having one end permanently fixed in a socket in the bracket with the bore of the pipe communicating with the interior of the Bourdon tube, a pressure flask permanently united to the opposite end of the tailpiece, the other end of the pipe leading into said pressure flask, the bore in the pipe providing the only communication with the interior of the pressure flask and constituting a canal devoid of lateral outlets, connecting the interior of the flask with the interior of the Bourdon tube, and a substantially non-compressible liquid filling the pressure flask, said pipe and the interior of the Bourdon tube.

7. An instrument of the class described which comprises as a unit a case having a hollow movable pressure-responsive element, a rigid unitary tailpiece having one end secured to the case and having a radial flange and union nut at its opposite end, a guard device fixed to said latter end of the tailpiece, the guard device having therein a fluid-receiving space, there being a conduit which extends lengthwise of the tailpiece and which connects the fluid-receiving space in the guard device with the interior of the pressure-responsive element, a substantially non-compressible liquid filling the pressure-responsive element, the conduit and the fluid-receiving space of the guard device and pulsation dampening means interposed between the ends of said conduit and located wholly within the case.

8. An instrument of the class described comprising in combination a case, a rigid unitary tailpiece secured at one end to the case and constructed and arranged to constitute a support for the latter, a Bourdon tube within the case, a guard device defining an enclosed fluid-receiving space, fixed and permanently secured to the other end of the tailpiece, a conduit leading from the fluid-receiving space of the guard device to the interior of the Bourdon tube, a substantially non-compressible liquid filling the tube, the conduit and the guard device, a portion of the conduit which is within the case being constructed and arranged to constitute pulsation dampening means, said conduit providing the only communication with the interior of the flask and constituting a passage, devoid of lateral outlets, connecting the interior of the flask with the interior of the Bourdon tube, and means for removably securing the tailpiece to a container for pressure fluid, said securing means including a union nut mounted on and inseparable from the tailpiece.

9. An instrument of the class described including a casing and a rigid unitary tubular tailpiece having one end secured to the casing, a bracket fixed to the interior of the casing wall, a Bourdon tube having one end anchored to the bracket, a gauge movement mounted on the bracket, means for transmitting motion of the free end of the tube to the gauge movement, a pipe extending from the lower end of the tailpiece longitudinally through the latter into the case, said pipe having a loop portion encircling the gauge movement and having one end fixed in a socket in the bracket with the bore of the pipe communicating with the interior of the Bourdon tube, pulsation dampener means in the loop in the pipe within the case, a pressure flask secured to the other end of the tailpiece, the opposite end of the pipe leading into said pressure flask, the bore of the pipe providing the only communication with the interior of the pressure flask and constituting a passage, devoid of lateral outlets, connecting the interior of the flask with the interior of the Bourdon tube, and a body of substantially non-compressible liquid filling the tube, the pipe and the flask.

10. Apparatus of the class described comprising as a unit a case having therein a hollow pressure-responsive element and a pulsation dampener, a rigid tubular tailpiece having one end fixed to the case, a guard device permanently secured to the opposite end of the tailpiece, said guard device having resilient walls defining an inner chamber, and a pipe extending from said inner chamber of the guard device through the tailpiece and into the case with its end, which is within the case leading into the pressure-responsive element, said pipe being devoid of lateral outlets and normally constituting the only means of communication with the interior of the guard device and pressure-responsive element, respectively, a portion of the pipe which is within the case constituting the aforesaid pulsation dampener, a body of substantially incompressible liquid filling the pressure-responsive element, the pipe and the inner chamber of the guard device, and means operative removably to secure said unit to a pressure fluid container designed to house the guard device.

11. An instrument of the class described comprising a case which houses a Bourdon tube and a gauge movement, a rigid, unitary, tubular, elongate tailpiece having a smooth cylindrical body portion and having one end fixed to the wall of the case, the opposite end portion of the tailpiece being of larger external diameter than the body of the tailpiece, said enlarged portion having a radial flange provided with a seat surface at its under side and a chambered guard device permanently united to the flanged end of the tailpiece, there being a duct extending lengthwise of the tubular tailpiece and connecting the interior of the guard device with the interior of the Bourdon tube, the chamber within the guard device, the duct and the interior of the Bourdon tube being filled with a substantially incompressible liquid, and a union nut having an inwardly directed flange normally embracing said enlarged portion and engaging the flange of the tailpiece, said nut being operative to secure the tailpiece to a screw-threaded hollow support wherein the guard device is normally housed.

FRANK H. HOPKINS.